April 30, 1940.  A. OBERHOFFKEN ET AL  2,198,633
MACHINE TOOL
Filed June 18, 1937  5 Sheets-Sheet 2

INVENTOR
Alexander Oberhoffken
Henry R. Johnson
By Parker, Carlson, Pitzner & Hubbard
ATTORNEYS April 30, 1940.  A. OBERHOFFKEN ET AL  2,198,633
MACHINE TOOL
Filed June 18, 1937   5 Sheets-Sheet 3

INVENTORS
Alexander Oberhoffken
Henry R. Johnson
By Parker, Carlson, Pitzner & Hubbard
ATTORNEYS April 30, 1940. A. OBERHOFFKEN ET AL 2,198,633
MACHINE TOOL
Filed June 18, 1937 5 Sheets-Sheet 4
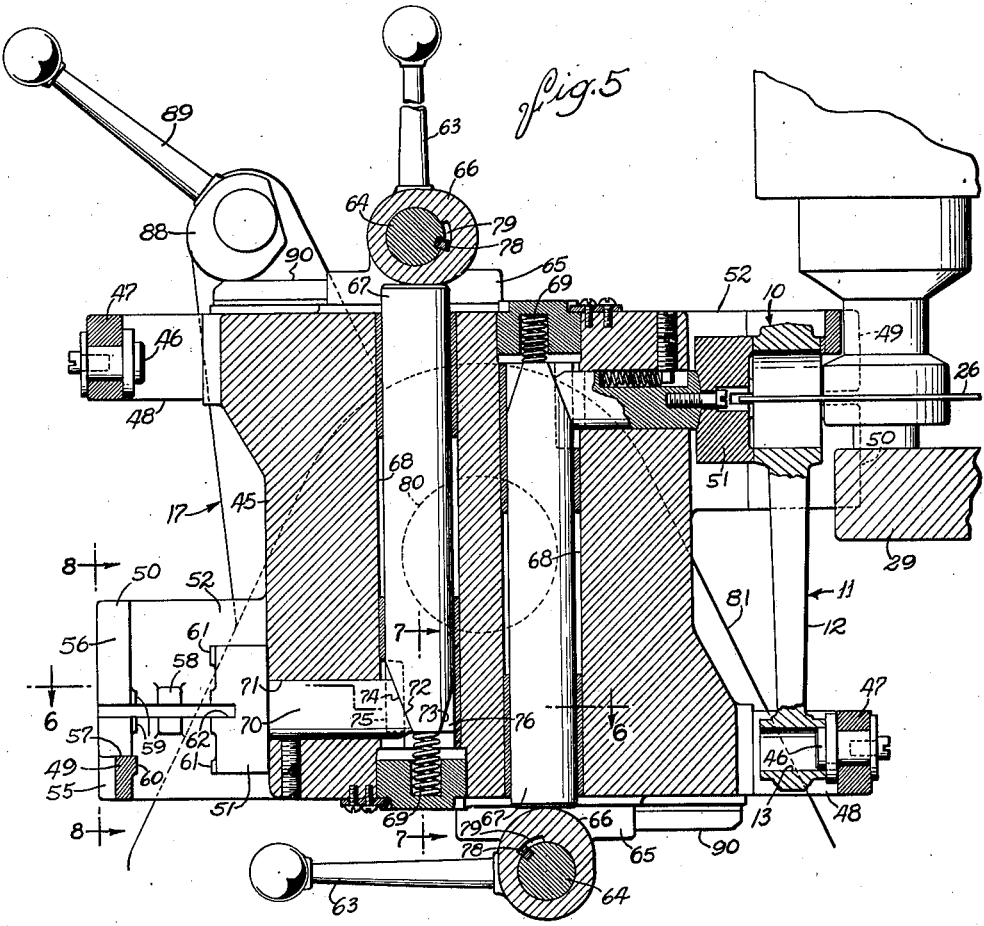
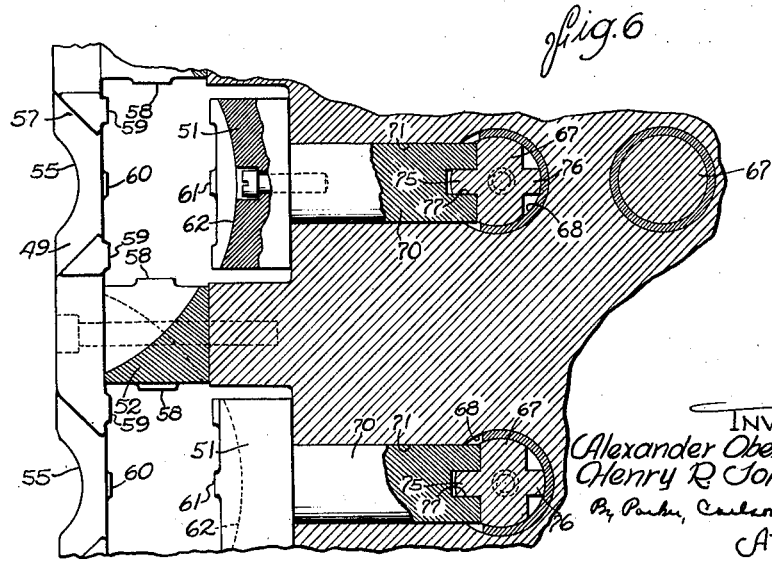
INVENTOR
Alexander Oberhoffken
Henry R Johnson
ATTORNEYS April 30, 1940.  A. OBERHOFFKEN ET AL  2,198,633
MACHINE TOOL
Filed June 18, 1937  5 Sheets-Sheet 5
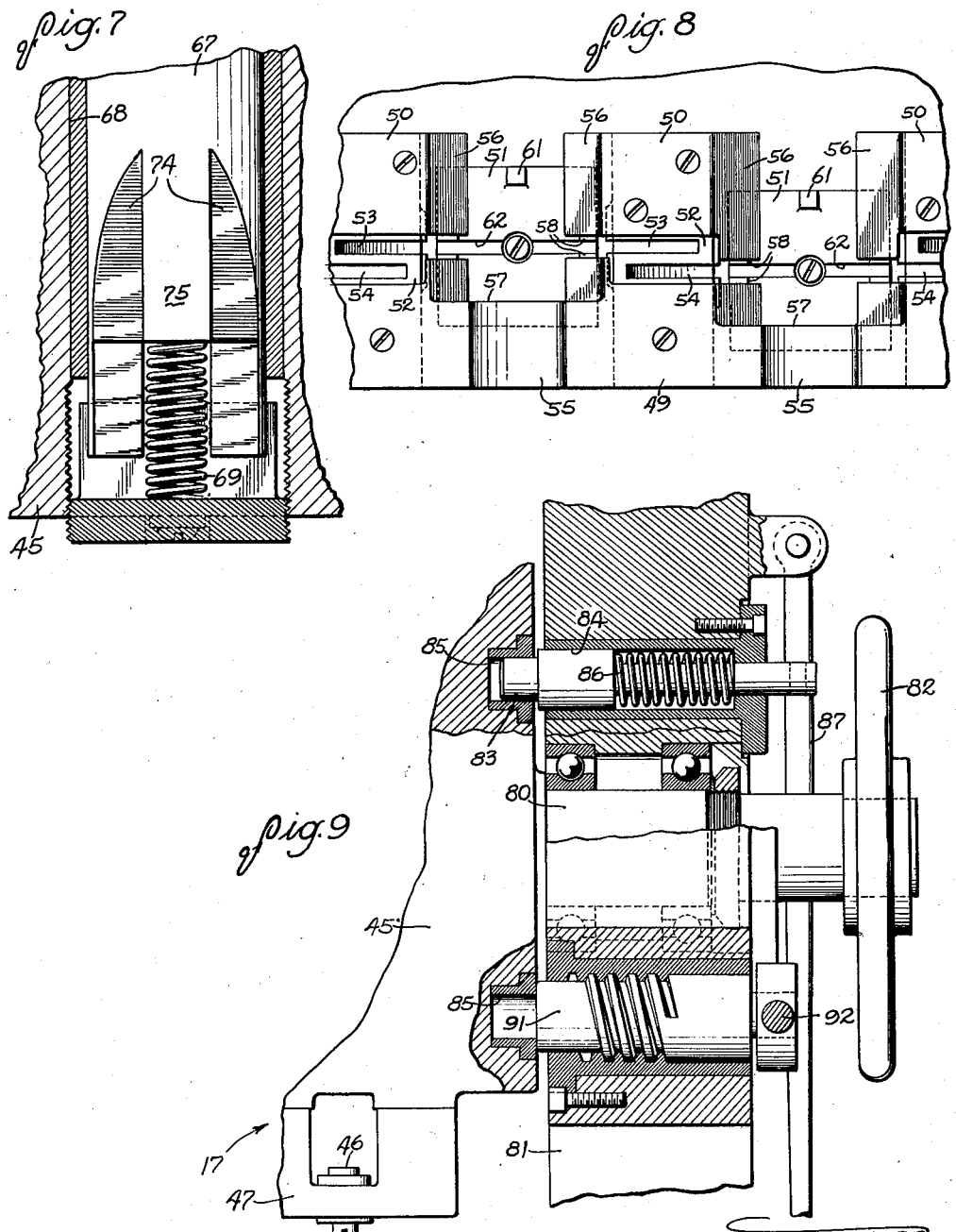

Patented Apr. 30, 1940

2,198,633

UNITED STATES PATENT OFFICE 2,198,633

MACHINE TOOL

Alexander Oberhoffken and Henry R. Johnson, Rockford, Ill., assignors to The Ingersoll Milling Machine Company, Rockford, Ill., a corporation of Illinois Application June 18, 1937, Serial No. 148,885

11 Claims. (Cl. 29—70)

The invention relates to machine tools and more particularly to machine tools adapted to perform the same machining operation on a plurality of successive groups of work blanks presented thereto in the course of mass-production manufacturing operations such as are commonly utilized in the automobile industry, for example.

The general object of the invention is to provide an improved and simplified machine tool of the type set forth which is adapted to perform effectively and efficiently a selected machining operation on successive groups of work blanks of a maximum number and in a minimum length of time.

Another object of the invention is to provide in a machine tool of the character described an improved and simplified work clamping mechanism adapted to properly clamp a large number of work pieces and to disengage the same quickly.

A more specific object of the invention is to provide in such a machine tool a work clamping fixture embodying a plurality of clamping devices individually actuatable to their clamped positions and movable by a single operating member to their unclamped positions.

Still another object of the invention is to provide a machine tool adapted to sever corresponding portions from successive groups of metal work blanks presented thereto, such as connecting rod blanks. This is preferably accomplished by providing a plurality of circular saws disposed in overlapping staggered relation and adapted to be moved into and out of engagement with a group of work blanks disposed on a suitable work support in correspondingly staggered relation thus minimizing the size of the machine and increasing the number of work blanks that may be handled in a single operation.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which:

Figure 1 is a perspective view of a machine tool embodying the invention and which is particularly adapted to sever the cap portions from elongated connecting rod blanks or the like.

Fig. 5 is a transverse sectional view of the work supporting fixture of the machine, the section being taken along the line 5—5 in Fig. 1.

Fig. 6 is a sectional view along the line 6—6 in Fig. 5.

Fig. 7 is a detail sectional view of the lower end of one of the actuating plungers included in the clamping mechanism for the machine work supporting fixture, the section being taken along the line 7—7 in Fig. 5.

Fig. 8 is an enlarged front elevation of a portion of the work fixture clamping mechanism.

Fig. 9 is a detail sectional view along the line 9—9 in Fig. 2 illustrating particularly the mechanism for maintaining the work fixture in a selected one of its plural operative positions.

Figure 4:
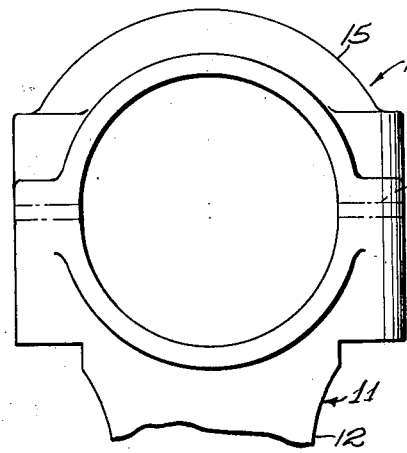
Fig. 4 is a detail view of the circular end portion of a connecting rod blank of the type adapted to be severed by the machine shown in Fig. 1.

For purposes of illustration, the invention has been shown and described herein as embodied in a machine for severing the cap portions from elongated connecting rod blanks or the like. The enlarged circular end 10 of such a blank is shown in Fig. 4, the blank being designated generally by the numeral 11. An elongated shank 12 connects the circular end 10 of the blank and a small circular end 13 (Fig. 5) adapted to receive a wrist pin bearing. The blank 11 is formed by forging or some similar metal shaping operation, then by severing the same as indicated in dot-dash lines at 14, the semi-circular bearing retaining cap portion 15 is separated from the body of the blank. It is preferable to thus fashion the connecting rod proper and its cooperating bearing retainer cap from a single forged metal blank in order that the lines of flow of the metal in the retaining cap and connecting rod will be uniform.

Figure 1:
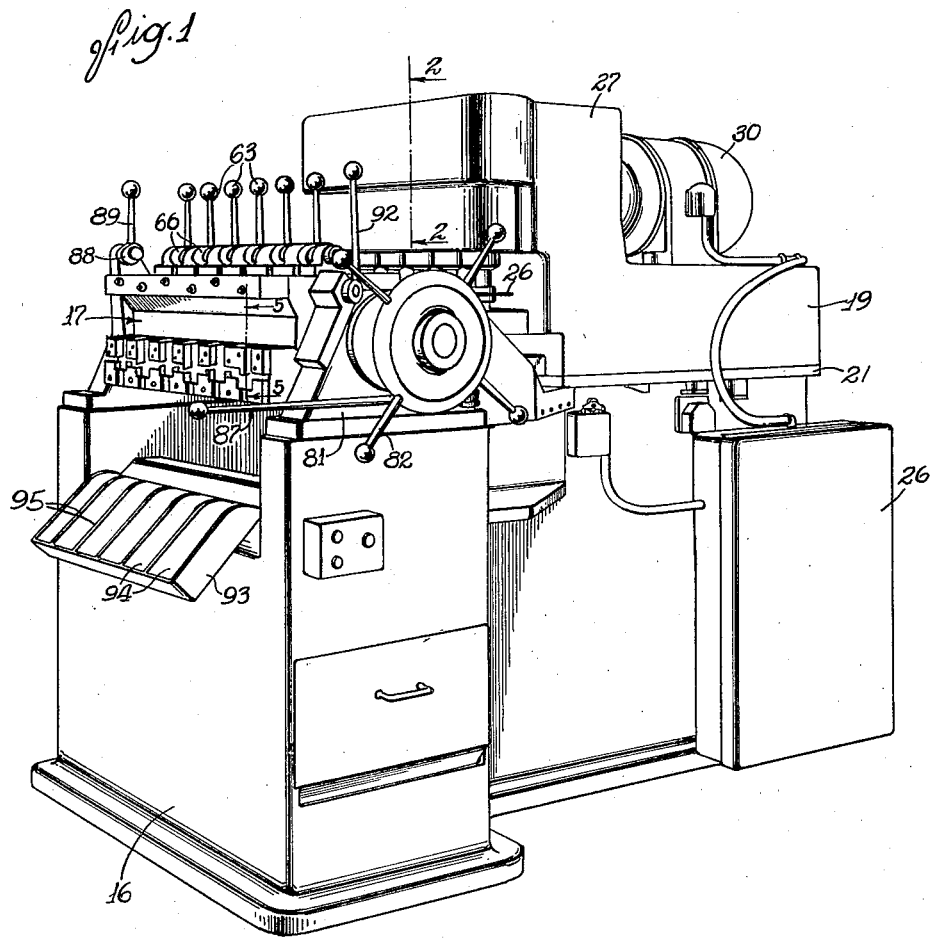

Upon reference to Fig. 1, it will be seen that the preferred machine illustrated herein includes a bed 16, carrying a work support or fixture 17, and a tool supporting carriage 19, which are movable relative to each other by a suitable power actuating mechanism. Preferably, the tool support is adapted to have two or more sets of work blanks clamped thereon and alternatively presented to the power actuated metal removing tools mounted on the tool support so that one finished set of blanks may be clamped in position on the fixture while another set is being machined. The fixture illustrated embodies an improved form of clamping mechanism which in accordance with the present invention is adapted to clamp a large number of work pieces and to release the same under the control of a simple easily manipulated operating mechanism.

Figure 2:
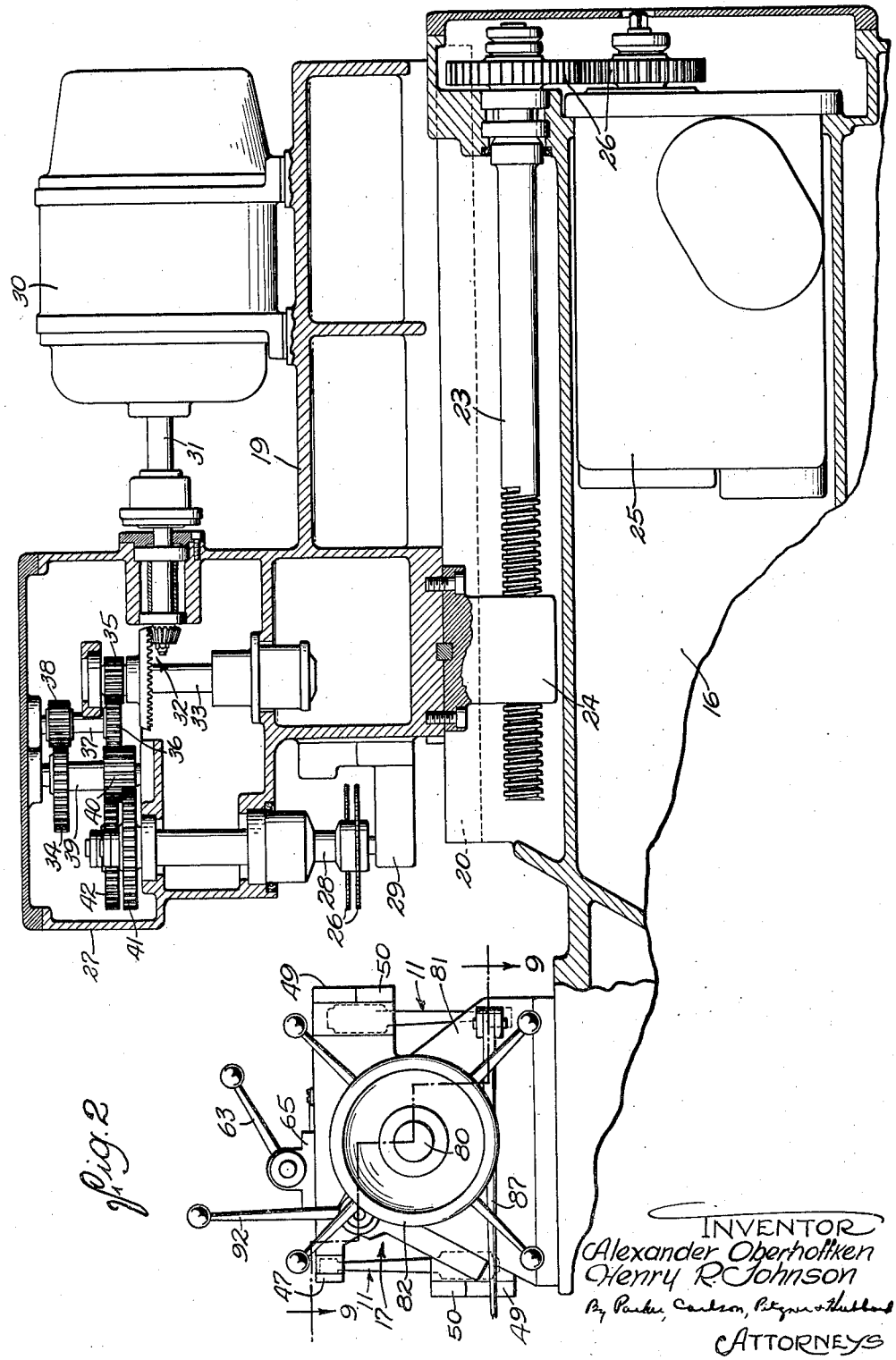
Fig. 2 is an enlarged side elevation partly in section along the line 2—2 of the machine shown in Fig. 1, the lower portion of the machine base being broken away.
Figure 3:
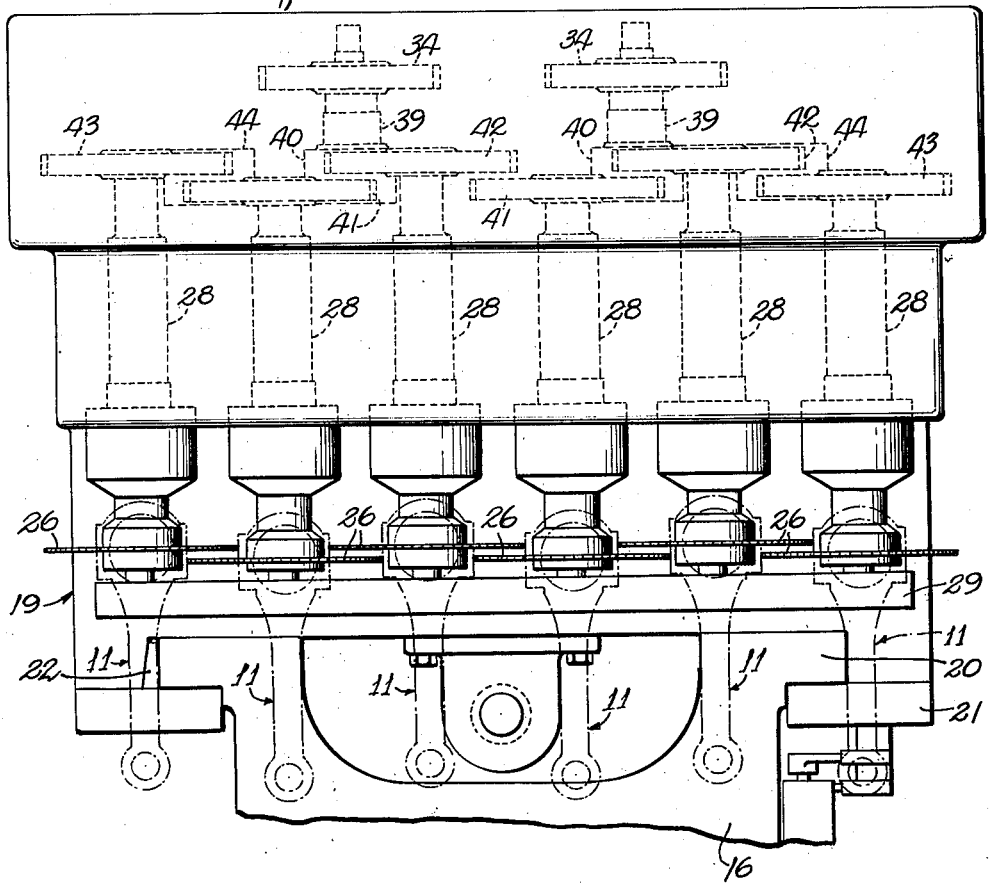
Fig. 3 is an enlarged front elevation of the tool head of the machine shown in Fig. 1.

Upon reference to Figs. 2 and 3, it will be seen that the carriage 19 is mounted for traversing movement on the bed 16. Thus, the carriage 19 is slidably mounted on horizontal ways 20 and held against upward and sidewise movement by retaining plates 21 and a gib 22, respectively. Traversing movement is imparted to the carriage 19 by a lead screw 23 threaded in a fixed nut 24 secured to the lower side of the carriage. A suitable power actuating mechanism illustrated in the form of an electric motor driven power unit 25 is connected to the lead screw 23 through gearing 26 and serves to rotate the same. An automatic control arrangement is preferably provided for the power unit 25 so that upon the momentary closure of a push button switch the carriage 19 will be traversed toward the fixture 17 and then retracted to its initial position.

A plurality of metal removing tools illustrated in the form of circular saws 26 are carried by a tool head housing 27 with their active cutting edges presented to the work blanks 11 mounted on the fixture 17. Upon reference to Figs. 2 and 3 it will be seen that the saws 26 are secured to arbors or shafts 28 having their upper ends journaled in the tool head housing 27 and their lower ends journaled in a bracket 29. As best shown in Fig. 3, the saws 26 are arranged in overlapping staggered relation so that a maximum number of saws may be carried by a tool head of minimum width. In this way, the machine is adapted to operate on a maximum number of work blanks during each cycle of operation. The work blanks 11 are disposed on the fixture 17 side by side and in correspondingly staggered relation so that the saws 26 engage the same partition of each of the associated work blanks. As the carriage 19 is traversed toward the work fixture 17, the saws 26 move into engagement with the work blanks and sever the cap portions therefrom along the dot-dash lines 14 (Fig. 4) as described above. It will be noted that one saw is associated with each work blank so that a minimum number of saws or cutting tools is required.

Rotary motion is imparted to the saws 26 from a single source of power exemplified by the electric motor 30. This motor is fixedly mounted on the rear end of the traversing carriage 19 and its driving shaft 31 is connected through bevel gearing 32 (Fig. 2) with an idler shaft 33 journaled in the tool head housing 27. Rotary movement is transmitted from the idler shaft 33 to a pair of gears 34, through a gear 35 on the shaft 33 meshing with a gear 36 on a second idler shaft 37 and which in turn carries a gear 38 meshing with the pair of gears 34. Three of the saw arbors or shafts 28 are driven from one of the gears 34 while the other three saw arbors are driven from the second one of the gears 34. Thus, the gears 34 are fast on shafts 39 having elongated gears 40 thereon, which mesh with gears 41 and 42 secured to the inner pairs of saw arbors. The outer saw arbors 28 are connected to the gears 42 through gears 43 on the respective outer saw arbors and idler gears 44. It will thus be seen that all of the circular saws 26 are rotated in the same direction from a common source of power, namely, the electric driving motor 30.

As was noted above, the blanks 11 are in general disposed side by side in staggered relation on the work fixture 17 in such manner that they will be engaged at corresponding points by the respective tools which operate on them. Provision is made for releasably securing identical sets of blanks on opposite sides of the fixture 17 so that they may be alternatively shifted into engagement with the saws 26 by rotating the fixture 17 180 degrees about its longitudinal axis. The fixture 17 is elongated in form and includes a heavy rigid cast metal fixture body 45 which is generally rectangular in cross section (Fig. 5). The small circular ends of the work blanks 11 are seated on pins 46 which are carried by bars 47 supported in spaced relation with respect to the fixture body by spacers 48. The enlarged circular ends of the blanks 11 are releasably clamped on the fixture body in such manner that the clamping mechanism will not interfere with the saws 26 and also in such manner that the severed end cap portions will not fall from the fixture until the clamping mechanism is released.

Upon reference to Figs. 5, 6 and 8, it will be seen that the clamping mechanism for the enlarged circular ends of the blanks 11 includes in general a fixed clamping jaw made up of an elongated bar 49 and blocks 50 as well as a series of cooperating movable clamping jaws 51. The bar 49 and blocks 50 are maintained in spaced relation with respect to the adjacent face of the fixture body 45 by a series of spacer blocks 52 arranged between the adjacent movable jaws 51. As best shown in Fig. 8, a space is provided between the blocks 50 and bar 49 in order to accommodate the saw blades 26 therebetween. In addition, grooves 53 and 54 are formed in the spacer blocks 52 to receive the edges of the saw blades when in their innermost positions. Since the saw blades are disposed in staggered overlapping relation, these recesses are also arranged in the same manner. Semi-circular recesses 55 in the front face of the bar 49 accommodate the saw arbors while the tapered sides 56 of the blocks 50 and correspondingly tapered sides of notches 57 in the bar 49 receive the hubs of the saws. Gauging projection 58 on the spacer blocks 52 determines the lateral position of the enlarged circular ends 10 of the work blanks while cooperating gauging projections 59, 60 and 61 on the bar 49, stationary blocks 50 and movable clamping jaw 51, respectively, engage the side faces of the enlarged end of the blank. It will be noted that recesses or slots 62 are also formed in the front faces of the movable clamping jaws 51 to accommodate the inner edge of the saw blades 26 when positioned as shown in Fig. 5.

The clamping mechanism provided on the fixture 17 includes several improved features especially adapting the same for high speed operation of the machine. In general, individually operable handles are provided for shifting the movable clamping jaws 51 into clamping position and the mechanism is so arranged that any one of these handles may be used to shift all of the movable clamping jaws to their released position. Also the mechanism is such that it may be readily changed to accommodate work blanks of different standard thicknesses. Thus, connecting rods for eight-cylinder engines are usually somewhat thinner than those for six-cylinder engines and consequently, it is desirable that the clamping mechanism should be adapted to quickly and effectively clamp connecting rod blanks of standard thicknesses for either of two sizes of engines. This latter effect is accomplished by using a cam-type actuating mechanism for the movable jaws 51 in which alternative cam surfaces may be utilized to shift the movable jaws the desired distance.

In the particular clamping mechanism illustrated, a plurality of manual operating handles 63 are loosely journaled on shafts 64 extending longitudinally of the fixture jaw 45 and in turn loosely journaled in brackets 65 attached to the fixture jaw. An actuating handle 63 is provided for each of the work blanks to be clamped and it will be seen that they are arranged in two groups corresponding to the two groups of work blanks which may be secured to the fixture. The handles 63 serve to rotate generally elliptical cams 66 loosely journaled on the shafts 64 thus causing the same to move actuating plungers 67 axially in suitable bores or apertures 68 formed in the fixture body 45 against the bias of compression springs 69.

Downward movement of the actuating plungers 67 upon oscillation of the associated operating handle 63 causes the lower ends of the plungers to exert a wedging pressure on the contacting inner ends of supporting pins 70 attached to the movable clamping jaws 51 so that these jaws are shifted outwardly into clamping engagement with the work blanks. The pins 70 are slidably mounted in bores 71 communicating with the bores 68. Upon reference to Fig. 5, it will be seen that inclined faces 72 and 73 are formed on the opposite sides of the lower ends of the actuating plungers 68 and adapted to contact with inclined faces 74 on the inner ends of the pins 70. The inclined faces 73 are displaced laterally a greater distance from the center lines of their respective plungers than are the faces 72, however, so that the pins 70 will be moved outwardly a different predetermined distance depending upon which of the faces 72 or 73 is in contact therewith. Consequently, the actuating mechanism may be arranged to shift the movable clamping jaws 51 outwardly one of two selected distances by bringing either the inclined face 72 or 73 into operative position.

Undesired rotation of the plungers 67 is prevented by ribs 75 and 76 thereon (Fig. 6). When the plunger is set in the angular position illustrated in Figs. 5 and 6, the ribs 75 are positioned in complementary slots 77 formed in the inner ends of the pins 70. In such case, the opposite ribs, namely, the ribs 76 serve to form an elongated bearing surface for the plungers against the adjacent inner wall of the bore 68. This is particularly desirable in that it prevents frictional wedging of the plungers 67 and permits them to be freely moved to their retracted positions by the compression springs 69 when the cams 66 are rotated to their released positions.

Lost motion connections are provided between each of the plunger actuating cams 66 and shafts 64 by pins 78 and slots 79 (Fig. 5). As a result, movement of any one of the cams 66 to its clamping position will not cause any movement of the associated shaft 64. When any one of the handles 63 is moved to shift its associated cam 66 to released position, however, the pin 78 abuts against the adjacent end of the slot 69 thus rotating the shaft 64 and causing all of the cams 66 on the same shaft to be moved to their released positions. This arrangement greatly facilitates the rapidity with which machined blanks may be released from the clamping mechanism. At the same time, the use of individual actuating handles for the several clamping devices precludes the necessity of exerting a strong pressure on the operating handles in clamping the blanks and the operator gives particular attention to each blank in order to be sure that it is properly clamped.

The work fixture 17 is mounted for rotation about its longitudinal axis by trunnions 80 (Fig. 9) journaled in upstanding brackets 81 on the machine bed 16. A handwheel 82 attached to one of the trunnions 80 enables the operator to move the work fixture 17 successively through arcs of approximately 180 degrees to position the successive sets of work blanks in operative relation with the saws 26. A retractible dowel pin 83 slidably mounted in a bore 84 in the bracket 81 is adapted alternatively to engage registering holes 85 in the adjacent end of the fixture body 45 in order to maintain the fixture in its selected angular position. A compression spring 86 normally biases the dowel pin 83 to its projected position and an elongated manual operating handle 87 may be utilized to retract the dowel pin preparatory to rotating the work fixture by the handwheel 82. A generally elliptical clamping cam 88 (Fig. 5) is mounted on the bracket 81 and may be shifted by an operating handle 89 into contact with steel pads 90 on the fixture body 45 so as to hold the same firmly in position against the dowel pin 85 and thus prevent chattering or vibration of the fixture during the machining of the work blanks carried thereby.

Endwise movement or chattering of the work fixture is prevented by a special clamping mechanism. This arrangement is desirable in view of the fact that all of the saw blades 26 rotate in the same direction and consequently exert a strong endwise thrust on the fixture. This clamping arrangement includes an axially movable pin 91 (Fig. 9) threaded in a suitable aperture in the fixed bracket 81. The pin 91 is screwed into tight clamping engagement with the adjacent end of the fixture body 45 by an actuating handle 92. The threads on the pin 91 are thick and can thus withstand heavy axial pressure.

In the operation of the machine described above a series of work blanks 11 is positioned in one of the sets of clamping mechanisms on the work fixture 17. The corresponding operating handles 63 are moved to clamp the set of blanks tightly in position. The operator then shifts the clamped set of blanks into operative position by first retracting the dowel pin 83 by the lever 87 and then rotating the fixture through 180 degrees by the handwheel 82. The dowel pin 83 is allowed to enter the corresponding aperture 85 in the fixture, accurately determining its proper position, and the fixture is clamped in such position by the clamping levers 89 and 92. The saw driving motor 30 and carriage traversing mechanism are then set in operation so that the rotating saw blades 26 are traversed forwardly into engagement with the work blanks 11 and sever the enlarged circular ends thereof as the saws advance through the blanks. Upon the completion of this severing operation the carriage 19 is automatically retracted to its initial position. While the machining operation described is in progress, the operator clamps a second set of work blanks on the fixture. It will be noted upon reference to Figs. 1 and 5 that the operating handle 63 of the clamping mechanisms for the reserve set of blanks is always positioned at the top of the fixture so that they are readily accessible. After the carriage 19 has been retracted upon the completion of the machining operation, the operator again rotates the work fixture 17 through 180 degrees in the manner described and the machined blanks are removed therefrom and a new set of blanks clamped in place. A sheet metal apron 93 divided into individual compartments 94 by partitions 95 (Fig. 1) is adapted to receive the machined blanks and the individual compartment arrangement makes it possible to retain the severed cap portion of the blank with its corresponding body portion. It will thus be seen that a machine has been provided which is adapted to perform the same machining operation on successive sets of work blanks with a high degree of efficiency and rapidity.

Although a particular embodiment of the invention has been shown and described in some detail for purposes of illustration, there is no intention to thereby limit the invention to such preferred embodiment but, on the other hand, the appended claims are intended to cover all modifications within the spirit and scope of the in-invention.

We claim as our invention:

1. A machine tool comprising, in combination, a tool support, a power actuated metal removing tool carried by said tool support, a work supporting fixture, a clamping mechanism for releasably securing a plurality of groups of work blanks on said fixture at spaced points, means for shifting said fixture to bring a selected one of said groups of blanks into operative relation with said tool, the others of said groups being out of operative relation with the tool to permit loading and unloading the same while the first named group of blanks is being machined, said clamping mechanism including a plurality of operating handles each operable to clamp an associated work blank and arranged in groups corresponding to said groups of work blanks, and means responsive to an unclamping movement of any one of said handles for releasing all of the blanks in the associated group.

2. A machine tool comprising, in combination, a tool support, a metal removing tool carried by said tool support, an elongated work fixture mounted for rotary movement about its longitudinal axis, means on said fixture for receiving a plurality of groups of work blanks thereon at spaced points about its axis of rotation, whereby said fixture may be rotated to bring selected ones of said groups into operative relation with said tool, the other of the groups being out of operative relation with the tool to permit loading and unloading the same while the machining operation is in progress, a plurality of movable clamping members on said fixture adapted to releasably clamp individual blanks in position, means including a plurality of operating handles for moving individual ones of said clamping members into clamping position, and means responsive to the unclamping movement of any one of said handles for moving the remainder of the clamping members in the same group to released position.

3. In a machine tool, a clamping mechanism for engaging a plurality of work blanks for machining comprising, a plurality of pairs of relatively movable clamping jaws adapted to receive individual work blanks therebetween, actuating means including individual operating members for each of said pairs of jaws for selectively moving the same individually from unclamped into clamped position, and means responsive to a movement of any selected one of said operating members for simultaneously moving all of said pairs of jaws to unclamped position.

4. In a machine tool, a clamping mechanism for engaging a plurality of work blanks for machining comprising, a plurality of pairs of relatively movable clamping jaws adapted to receive individual work blanks therebetween, and actuating means for moving selected and individual ones of said jaws into clamped position and for moving said jaws simultaneously into unclamped position.

5. In a machine tool, a clamping mechanism for engaging a plurality of work blanks for machining comprising, an elongated rotatable shaft, a plurality of individual cams journaled on said shaft and having lost motion connections therewith, a plurality of movable clamping members, and means for moving said clamping members from unclamping to clamping position in response to movement of corresponding ones of said cams to an extremity of their lost motion movement with respect to said shaft, whereby all of said clamping members may be simultaneously released by rotating said shaft in response to movement of any one of said cams in the opposite direction.

6. In a machine tool, a clamping mechanism for engaging a plurality of work blanks for machining comprising, an elongated work fixture body having a plurality of transverse bores therein, a shaft extending lengthwise of said fixture and journaled thereon, a plurality of oscillatable peripheral cams journaled on said shaft and having lost motion connections therewith, a plurality of clamping members movable into clamping and unclamping position, means including axially slidable pins mounted in said bores for actuating said clamping members, each of said pins being arranged with an end thereof contacting a corresponding one of said cams, whereby said pins may be shifted axially to move the corresponding one of said clamping members into clamping position by oscillation of its associated cam and all of said cams simultaneously oscillated in an opposite direction to release said pins and clamping members upon rotation of said shaft.

7. In a machine tool, a clamping mechanism adapted to engage successive work blanks of one of a plurality of standard thicknesses, comprising, a pair of relatively movable clamping jaws adapted to receive a work blank therebetween, a member projecting from one of said jaws having a cam surface thereon, means including a cooperating actuating member having a plurality of cam surfaces thereon and shiftable to bring any selected individual one of said last named cam surfaces into operative relation with said first-named cam surface for moving said jaws into clamping relation with a work blank disposed therebetween, and selectively operable means for shifting any selected one of said cam surfaces on said actuating member individually into operative relation with said first-named cam surface for thereby varying the extent of movement of said jaws to accommodate a work piece of corresponding thickness.

8. In a machine tool, a clamping mechanism adapted to engage successive work blanks of one of a plurality of standard thicknesses, comprising, a fixture base, a fixed clamping jaw on said base, a cooperating movable jaw having a rearwardly extending projection thereon slidably mounted in a registering aperture in said base, said projection having a cam surface on the inner end thereof, an axially slidable plunger carried by said base substantially at right angles to said projection and having a plurality of radially disposed cam surfaces thereon movable into operative relation with said first-named cam surface upon rotation of said plunger, and means for effecting axial movement of said plunger to shift said movable jaw a distance determined by the selected cam surface into engagement with a work blank of corresponding thickness.

9. In a machine tool, a clamping mechanism adapted to engage successive work blanks of one of a plurality of standard thicknesses, comprising, a fixture base, a fixed clamping jaw on said base, said base having a pair of communicating apertures therein disposed substantially at right angles, a cooperating movable clamping jaw carried by a rearwardly projecting member slidably mounted in one of said apertures and having an inclined rear face with a centrally disposed slot therein, an axially slidable actuating plunger mounted in the other of said apertures and having inclined faces of different contour formed on the inner end thereof, each of said inclined faces being provided with a central rib adapted to fit in said slot and to bear against the wall of said other aperture, whereby said plunger may be rotated to bring a selected one of said last named inclined faces into contact with said inclined face of said member to shift said movable jaw upon axial movement of said plunger while the rib bearing against the aperture wall prevents frictional binding of the plunger due to the resultant lateral thrust thereon.

10. A machine tool for severing the cap portions from elongated connecting rod blanks or the like comprising, in combination, a bed, an elongated work support mounted for rotation about its longitudinal axis on said bed, a carriage having a tool support thereon slidably mounted on said bed for movement toward and away from said work support, means for detachably securing two groups of connecting rod blanks on said work support at spaced points, the blanks in each group being arranged transversely of the work support and in successively staggered relation, a plurality of power actuated circular saws equal in number to the connecting rod blanks of one of said groups and disposed in correspondingly staggered and overlapping relation on said carriage tool support with the cutting edge of each saw presented to the same portion of a corresponding connecting rod blank, power actuating means for traversing said carriage toward and away from said work support, means for rotating said work support about its longitudinal axis to bring a selected one of said groups of blanks into operative relation with said saws, means including a retractible dowel pin cooperating with said bed and work support for releasably maintaining said work support in position with a selected one of the groups of blanks in operative relation with said saws, and means for rigidly clamping said work support in the selected angular position determined by said dowel pin.

11. A machine tool for severing the cap portions from elongated connecting rod blanks or the like comprising, in combination, a bed, an elongated work support mounted for rotation about its longitudinal axis on said bed, a carriage having a tool support thereon slidably mounted on said bed for movement toward and away from said work support, means for detachably securing a plurality of connecting rod blanks side by side on said work support and disposed transversely to the axis thereof in successively staggered relation, a plurality of power actuated circular saws equal in number to the connecting rod blanks disposed in correspondingly staggered and overlapping relation on said carriage tool support with the cutting edge of each saw presented to the same portion of a corresponding connecting rod blank, and power actuating means for traversing said carriage toward and away from said work support to move said saws substantially simultaneously into and out of engagement with the blanks.

ALEXANDER OBERHOFFKEN.
HENRY R. JOHNSON.